Nov. 2, 1926.
C. W. MANN
1,605,599
INTERNAL COMBUSTION ENGINE
Filed March 12, 1925
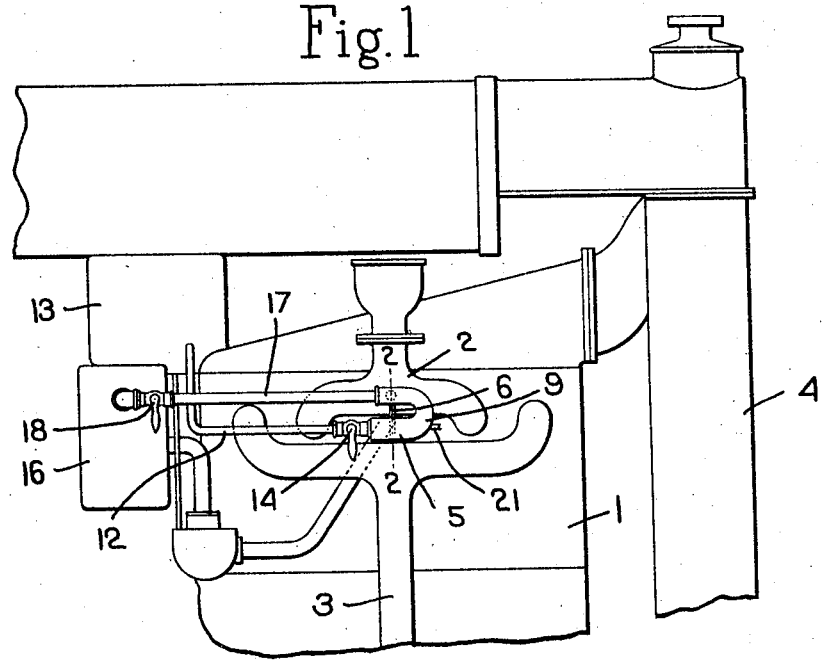
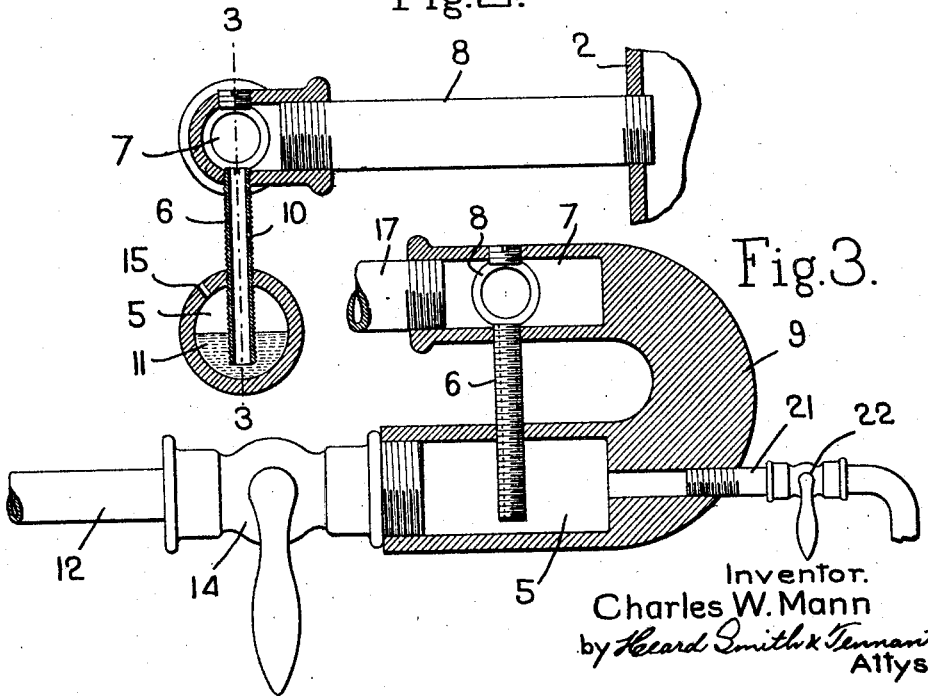
Inventor.
Charles W. Mann
by Heard Smith & Tennant.
Attys.

Patented Nov. 2, 1926.

1,605,599

UNITED STATES PATENT OFFICE.

CHARLES W. MANN, OF METHUEN, MASSACHUSETTS.

INTERNAL-COMBUSTION ENGINE.

Application filed March 12, 1925. Serial No. 15,156.

This invention relates to internal combustion engines and particularly to a device for introducing a priming charge into the intake manifold to assist in starting the engine and further to introduce into said manifold additional air after the engine has been started and is warmed up.

The features wherein the invention resides will be more fully hereinafter set forth and then pointed out in the appended claims.

In the drawings wherein I have illustrated a selected embodiment of my invention, Fig. 1 is a fragmentary and more or less diagrammatic view showing an internal combustion engine having my improvements applied thereto, the type of engine being one which may be used for operating a tractor;

Fig. 2 is an enlarged sectional view on the line 2—2, Fig. 1;

Fig. 3 is a section on the line 3—3, Fig. 2.

My invention can be used with any internal combustion engine and merely as illustrating one application thereof I have shown herein an engine of the type which is used in a well known tractor.

In Fig. 1, 1 indicates generally the internal combustion engine and 2 is the intake pipe, 3 the exhaust pipe and 4 the radiator. These parts may have any suitable or usual construction, the intake pipe presenting the usual two branches.

The feature of my invention relating to priming the engine to assist in starting it comprises a receptacle adapted to contain a charge of priming fuel and a suction pipe extending into said receptacle nearly to the bottom thereof and leading into the intake manifold at substantially the point where the latter branches, the entering end of the suction pipe being relatively small and provided with an air opening and the other end that connects to the intake manifold being somewhat larger.

In the present embodiment of the invention the receptacle for receiving the priming charge is indicated at 5. The suction passage which forms a communication between the chamber 5 and the intake manifold 2 comprises the pipe section 6 which is relatively small and which extends nearly to the bottom of the receptacle 5, the chamber 7 into which the pipe section 6 leads and a larger pipe section 8 connecting the chamber 7 with the intake manifold 2. In the embodiment herein shown the chambers 5 and 7 are shown as formed in a single member 9 but this is only one way in which the invention may be embodied and so far as the operation is concerned it is immaterial whether the two chambers 5 and 7 are formed in two pieces or in separate pieces.

The pipe section 6 is shown as having an air inlet 10 situated above the chamber 5, said inlet being directed upwardly so that air which enters it will be given an upward direction upon its entrance.

In using this device a priming charge 11 of gasoline or other priming fluid is delivered to the chamber 5 in sufficient quantities so that the lower end of the pipe section will be submerged therein as shown in Fig. 2. The engine is then cranked in the usual way either by hand or by the self-starter and the cranking operation develops a suction in the intake pipe 2 which draws the priming charge 11 through the pipe section 6 into the chamber 7 and from the chamber 7 through the pipe section 8 into the intake manifold. This suction also draws air into the port 10, this air mingling with the priming charge and assisting in vaporizing it.

The pipe section 6, it will be noted, is relatively small and there will, therefore, be a strong suction upwardly through said pipe section as the priming charge and air are delivered from the small pipe section 6 into the larger pipe section 8 there is room for expansion and vaporization to take place so that when the priming charge is finally delivered to the intake manifold 2 it is vapor rather than in the form of a spray of liquid. I find that the delivery of this priming charge into the intake manifold at the point where the latter branches is beneficial because better results are secured thereby than if the charge were delivered nearer the carbureter.

The priming charge may be delivered to the chamber 5 in any suitable way. One convenient way is to connect the pipe 12 to said chamber which leads to a tank containing gasoline, such as the tank 13.

14 indicates a valve controlling the pipe 12. With this arrangement the priming charge may be delivered to the receptacle 5 by simply opening the valve 14 and after the proper charge has been admitted the valve may be closed again. The use of the priming charge, therefore, involves simply opening the valve 14 to allow the priming charge to be delivered to the chamber 5 and then closing the valve again after which the engine may be cranked again as in the usual manner.

I will preferably provide the chamber 5 with an overflow port 15 through which surplus gasoline may flow if too large a priming charge is admitted to the chamber 5.

Another feature of the invention relates to a means for delivering moist air to the intake manifold after the engine has been started and has become thoroughly warmed up. This is provided for in the case of a tractor which has an air washing tank 16 by connecting the chamber 7 to the tank through the medium of a pipe connection 17, the latter having a control valve 18 therein. Where the tank 16 is an air washing tank the air which is delivered to the carbureter is drawn through water in said tank and thus becomes more or less humid. By opening the valve 18 some of this humid air will be delivered through the pipe 17, chamber 7 and pipe 8 directly into the intake manifold, there to mingle with the full charge delivered from the carbueter.

I propose to use this feature of the invention after the engine gets thoroughly warmed up and by so doing I am enabled to increase the power developed by the engine and also to decrease the gas consumption.

In the case of those engines that do not have an air washing tank 16 I may connect the pipe 17 to any other device which is adapted to produce moist or humid air or may even omit the tank 16 and simply take atmospheric air through the pipe 17 into the intake manifold.

21 indicates a pipe leading into the chamber 5 which is provided with a valve 22. This pipe may be used to introduce water into the chamber 5 when it is desired to steam out the carbon in the cylinders. At such times the valve 22 is opened and a receptacle containing water is placed under the end of the pipe 21 so that the suction which is created by the engine will draw water from the receptacle through the pipe 21 into the intake pipe 2 and thus into the cylinder. This water will be converted into steam and will operate to steam out the carbon in the cylinder in a well-known way.

I claim:

1. In an internal combustion engine, the combination with an intake manifold, of a chamber to contain a priming charge, said chamber having an overflow port, means to supply gasoline to said chamber, a suction pipe extending nearly to the bottom of said chamber and leading into the intake manifold, the portion of the suction pipe which connects to the chamber being relatively small and the portion leading into the intake manifold being relatively large.

2. In an internal combustion engine, the combination with an intake manifold, of a chamber to contain a priming charge, said chamber having an overflow port, a valved pipe connecting said chamber to a source of gasoline supply, a suction pipe extending nearly to the bottom of said chamber and leading into the intake manifold at the point where the latter branches, the portion of the suction pipe which connects to said chamber being relatively small and provided with an air inlet and the portion of the suction pipe leading into the intake manifold being relatively large.

3. In an internal combustion engine, the combination with an intake manifold, of a chamber to contain a priming charge, said chamber having an overflow port, a valved pipe connecting said chamber to a source of gasoline supply, a suction pipe extending nearly to the bottom of said chamber and leading into the intake manifold at the point where the latter branches, the portion of the suction pipe which connects to said chamber being relatively small and provided with an air inlet and the portion of the suction pipe leading into the intake manifold being relatively large, and a valved air inlet pipe communicating with the suction pipe.

In testimony whereof, I have signed my name to this specification.

CHARLES W. MANN.